United States Patent
Takamiya

(10) Patent No.: US 9,874,165 B2
(45) Date of Patent: Jan. 23, 2018

(54) EXHAUST GAS RECIRCULATION DEVICE

(71) Applicant: Fumio Takamiya, Gotenba (JP)

(72) Inventor: Fumio Takamiya, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 248 days.

(21) Appl. No.: 14/888,846

(22) PCT Filed: May 10, 2013

(86) PCT No.: PCT/JP2013/063143
§ 371 (c)(1),
(2) Date: Nov. 3, 2015

(87) PCT Pub. No.: WO2014/181461
PCT Pub. Date: Nov. 13, 2014

(65) Prior Publication Data
US 2016/0076470 A1    Mar. 17, 2016

(51) Int. Cl.
*F02D 41/00* (2006.01)
*F02D 13/02* (2006.01)
(Continued)

(52) U.S. Cl.
CPC ..... *F02D 41/0065* (2013.01); *F02D 13/0249* (2013.01); *F02D 41/0002* (2013.01); *F02D 41/0055* (2013.01); *F02D 41/042* (2013.01); *F02M 26/06* (2016.02); *F02M 26/23* (2016.02); *F02M 26/50* (2016.02);
(Continued)

(58) Field of Classification Search
CPC ............. F02D 41/0065; F02D 41/042; F02D 41/0055; F02D 13/0249; F02D 2200/101; F02D 2041/001; F02M 26/06; F02M 26/23; F02M 26/50; Y02T 10/47; Y02T 10/18
See application file for complete search history.

(56) References Cited

U.S. PATENT DOCUMENTS

| | | | |
|---|---|---|---|
| 6,729,315 B2* | 5/2004 | Onodera | F02B 37/16 123/568.21 |
| 2014/0100074 A1* | 4/2014 | Glugla | B60W 20/15 477/3 |

(Continued)

FOREIGN PATENT DOCUMENTS

| | | |
|---|---|---|
| JP | 2007-303381 A | 11/2007 |
| JP | 2008-002351 A | 1/2008 |

*Primary Examiner* — Hieu T Vo
*Assistant Examiner* — Sherman Manley
(74) *Attorney, Agent, or Firm* — Andrews Kurth Kenyon LLP

(57) ABSTRACT

An exhaust gas recirculation device capable of restraining generation of condensate water in an EGR path after engine stoppage is provided. When ignition is switched from ON to OFF, fuel injection is prohibited. As a result, a gas (fresh air) that flows into a cylinder after the switching is discharged into an exhaust passage without burning. In the present invention, a valve opening timing of an exhaust valve is changed so that a high peak portion of a pulsation of the gas arises at an EGR branch point, and the EGR valve is opened. Thereby, the fresh air flowing in the exhaust passage can be introduced into an EGR passage, and therefore an EGR gas in the EGR passage can be replaced with the fresh air.

8 Claims, 7 Drawing Sheets

(51) Int. Cl.
*F02M 26/06* (2016.01)
*F02M 26/50* (2016.01)
*F02M 26/23* (2016.01)
*F02D 41/04* (2006.01)

(52) U.S. Cl.
CPC .. *F02D 2041/001* (2013.01); *F02D 2200/101* (2013.01); *Y02T 10/18* (2013.01); *Y02T 10/47* (2013.01)

(56) References Cited

U.S. PATENT DOCUMENTS

| | | | | |
|---|---|---|---|---|
| 2014/0100758 | A1* | 4/2014 | Glugla | F02D 41/123 701/103 |
| 2015/0047340 | A1* | 2/2015 | Ulrey | F02B 47/08 60/600 |

\* cited by examiner

EXHAUST GAS RECIRCULATION DEVICE

CROSS-REFERENCE TO RELATED APPLICATION

This is a national phase application based on the PCT International Patent Application No. PCT/JP2013/063143 filed May 10, 2013, the entire contents of which are incorporated herein by reference.

TECHNICAL FIELD

The invention relates to an exhaust gas recirculation device.

BACKGROUND ART

Conventionally, adoption of an exhaust gas recirculation (Exhaust Gas Recirculation: EGR) device into an internal combustion engine has been publicly known. For example, Patent Literature 1 discloses an exhaust gas recirculation device that is provided with a communication path that connects an EGR passage between an EGR cooler and an EGR valve, and an exhaust passage downstream of a connection portion with the EGR passage, is provided with an exhaust throttle valve in the exhaust passage downstream of the connection portion with the EGR passage and upstream of a connection portion with the communication path, and executes control of closing the EGR valve and the exhaust throttle valve.

When the EGR valve is closed, communication of the EGR passage and the intake passage is cut off. When the exhaust throttle valve is closed, the inside of the exhaust passage at the upstream side of the exhaust throttle valve has a higher pressure than the inside of the exhaust passage at the downstream side of the exhaust throttle valve. Therefore, if the above described control is executed, the exhaust gas from the internal combustion engine can be caused to flow into the exhaust passage at the upstream side, the EGR passage, the communication path and the exhaust passage at the downstream side in this sequence. Therefore, even if condensate water is generated in the EGR passage such as the EGR cooler, the condensate water can be carried on the flow of the exhaust gas and discharged to the exhaust passage side. Consequently, corrosion of the EGR path due to residues of the condensate water can be prevented.

CITATION LIST

Patent Literature

Patent Literature 1: Japanese Patent Laid-Open No. 2008-002351

Patent Literature 2: Japanese Patent Laid-Open No. 2007-303381

SUMMARY OF INVENTION

Technical Problem

However, even when the above described control is executed, the exhaust gas still remains in the EGR path. Therefore, if the engine is stopped in this state, and the EGR path is cooled by the outside air, moisture in the residual exhaust gas condenses. That is to say, condensate water is generated in the EGR path during engine stoppage.

The present invention is made in the light of the aforementioned problem. That is to say, an object of the present invention is to provide an exhaust gas recirculation device capable of restraining generation of condensate water in an EGR path after engine stoppage.

Means for Solving the Problem

To achieve the above described object, a first invention is an exhaust gas recirculation device, comprising:
an EGR passage that connects an intake passage and an exhaust passage of an internal combustion engine;
EGR passage opening and closing means for opening and closing the EGR passage;
an exhaust valve that is provided at a cylinder of the internal combustion engine;
a variable valve mechanism that is capable of changing a valve opening characteristic of the exhaust valve; and
variable valve mechanism control means for controlling the variable valve mechanism,
wherein the variable valve mechanism control means changes a valve opening timing of the exhaust valve during non-execution of fuel injection, and causes a position where an amplitude of a pressure in the exhaust passage becomes maximum to coincide with a connection portion of the EGR passage and the exhaust passage, and
the EGR passage opening and closing means opens the EGR passage when a pressure in the connection portion is higher than a pressure in the intake passage, and closes the EGR passage when the pressure in the connection portion is equal to or lower than the pressure in the intake passage, during non-execution of fuel injection.

A second invention is the exhaust gas recirculation device according to the first invention,
wherein the variable valve mechanism is configured to be capable of changing the valve opening timing in accordance with an engine speed of the internal combustion engine, and
the variable valve mechanism control means advances the valve opening timing as the engine speed drops.

A third invention is the exhaust gas recirculation device according to the second invention,
wherein the variable valve mechanism is configured to be capable of changing a working angle of the exhaust valve in accordance with the engine speed, and
the variable valve mechanism control means enlarges the working angle as the engine speed drops.

A fourth invention is the exhaust gas recirculation device according to any one of the first to third invention, further comprising:
an air flow meter that detects a change of a flow velocity of intake air that flows in the intake passage; and
valve opening timing regulating means for regulating the valve opening timing in accordance with the change of the flow velocity of the intake air which is detected by the air flow meter during non-execution of fuel injection.

Advantageous Effect of Invention

When the exhaust valve is opened and closed, a variation in the pressure occurs in the exhaust passage. During non-execution of fuel injection, the gas (the fresh air) in the cylinders of the internal combustion engine is discharged into the exhaust passage as it is. That is to say, when the exhaust valve is opened and closed during non-execution of fuel injection, a variation in the pressure occurs due to the fresh air that flows in the exhaust passage. According to the first invention, during non-execution of fuel injection, the valve opening timing of the exhaust valve is changed and the position where the amplitude of the pressure in the exhaust passage becomes maximum is caused to coincide with the connection portion of the EGR passage and the exhaust passage, and when the pressure in the connection portion is higher than the pressure in the intake passage, the EGR passage is opened, whereas when the pressure in the connection portion is equal to or lower than the pressure in the intake passage, the EGR passage is closed. Therefore, the fresh air which generates a high pressure in the connection portion can be returned to the intake passage through the EGR passage. That is to say, the EGR passage can be scavenged with the fresh air. A temperature of the fresh air which is introduced into the EGR passage is substantially equal to an outside temperature. Accordingly, even if the engine is stopped after introduction of the fresh air, condensate water can be favorably restrained from being generated in the EGR passage during engine stoppage.

During non-execution of fuel injection, the engine speed drops. When the engine speed drops, a pulse interval of the pressure in the exhaust passage is extended, and therefore, a time period until a high pressure is generated again after a high pressure is generated in the above described connection portion becomes long. According to the second invention, the above described valve opening timing is advanced as the engine speed drops, and therefore, as compared with the chase where the above described valve opening timing is not changed, the time period until a high pressure is generated again after a high pressure is generated in the above described connection portion can be made shorter. Accordingly, scavenging in the EGR passage can be completed in a shorter time period.

When the valve opening timing of the exhaust valve is advanced, a valve overlap amount caused by the intake valve and the exhaust valve both being opened changes. According to the third invention, as the engine speed drops, the working angle of the exhaust valve is enlarged more by using the variable valve mechanism, and therefore, change to a large extent of the valve overlap amount can be restrained. Accordingly, a sense of deceleration which the driver of the vehicle or the like feels is enabled to be kept constant.

When a gas flows into the intake passage from the EGR passage, the gas interferes with the intake air which flows in the intake passage, and therefore, the intake air flow velocity changes. According to the fourth invention, the valve opening timing of the exhaust valve is regulated in accordance with the change of the intake air flow velocity which is detected by the air flow meter during non-execution of fuel injection, and therefore even if the peak position of the pressure in the exhaust passage shifts, the peak position can be caused to coincide with the above described connection portion.

DESCRIPTION OF EMBODIMENTS

Figure 1:
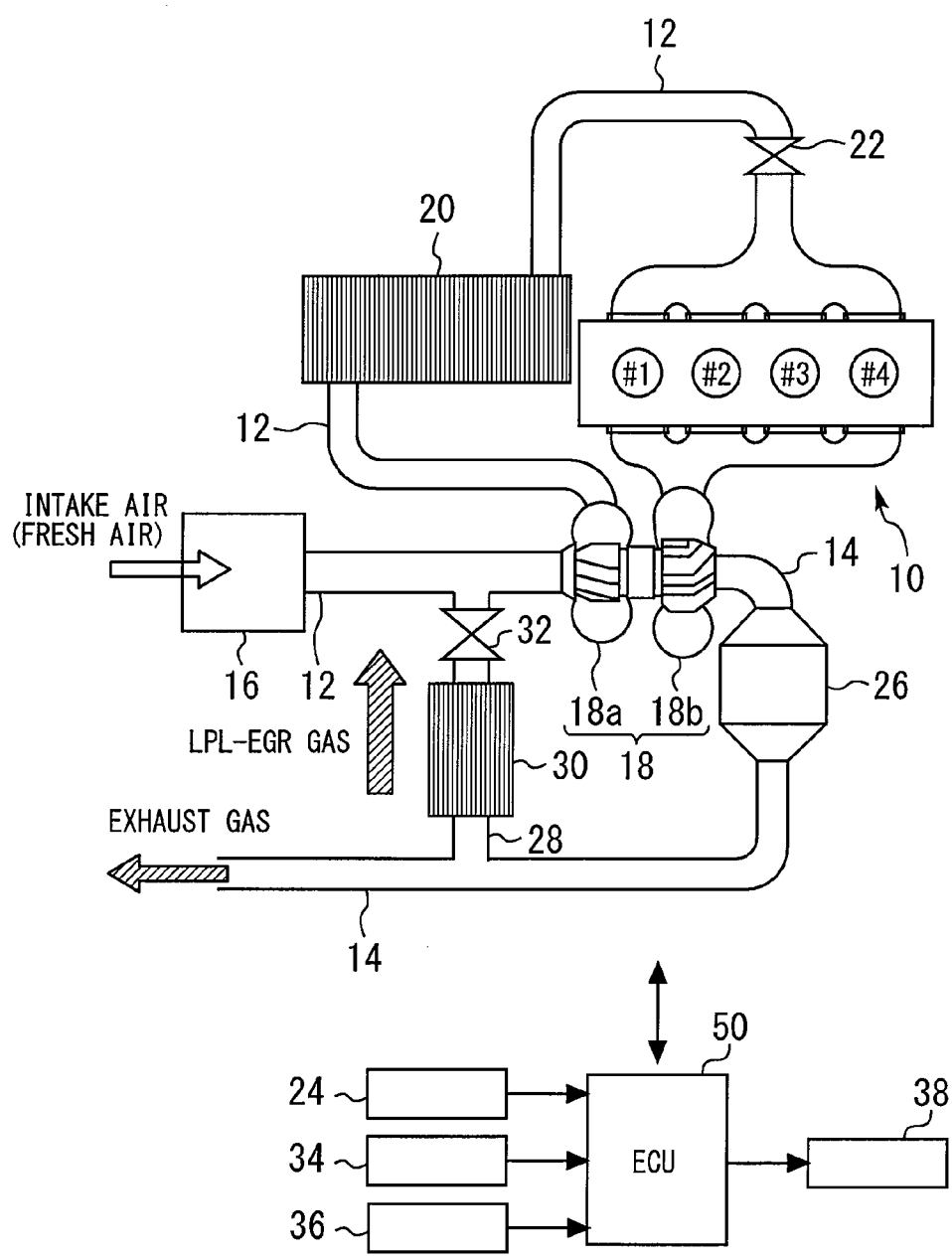
FIG. 1 is a diagram for explaining a configuration of an exhaust gas recirculation device of embodiment 1.

Hereinafter, embodiments of the invention will be described with reference to the drawings. Note that common elements in the respective drawings will be assigned with the same reference signs and redundant explanation will be omitted. Further, in the drawings, numerals that are assigned with # denote cylinder numbers.

Embodiment 1

[Configuration of Exhaust Gas Recirculation Device]

First, with reference to FIGS. 1 to 5, embodiment 1 of the present invention will be described.

FIG. 1 is a diagram for explaining a configuration of an exhaust gas recirculation device of embodiment 1. The exhaust gas recirculation device of the present embodiment includes an engine 10 as an internal combustion engine. It is assumed that the engine 10 is an in-line four-cylinder gasoline engine, and an ignition sequence of the engine is from cylinder number 1 to cylinder number 3 to cylinder number 4 to cylinder number 2. Note that in the present invention, the number of cylinders and disposition of the cylinders of the engine 10 are not limited to this. In the respective cylinders of the engine 10, injectors (not illustrated) for injecting fuel are installed.

An intake passage 12 and an exhaust passage 14 are connected to the respective cylinders of the engine 10. An air flow meter 16 that outputs a signal corresponding to a flow rate of intake air (fresh air) that is taken into the intake passage 12 is provided at an upstream side of the intake passage 12. A turbocharger 18 is provided in the intake passage 12 downstream of the air flow meter 16. The turbocharger 18 includes a compressor 18a and a turbine 18b. The compressor 18a and the turbine 18b are integrally connected by a connecting shaft. The compressor 18a is rotationally driven by energy of an exhaust gas that is inputted to the turbine 18b.

An intercooler 20 for cooling intake air that is compressed by the compressor 18a is provided in the intake passage 12 downstream of the compressor 18a. A throttle valve 22 is disposed downstream of the intercooler 20. The throttle valve 22 is an electronically-controlled valve that is driven by a motor, and is driven based on an accelerator opening degree AA that is detected by an accelerator opening degree sensor 24.

An exhaust catalyst 26 is disposed in the exhaust passage 14 downstream of the turbine 18b. The exhaust catalyst 26 is a three-way catalyst that efficiently purifies three components of HC, CO and NOx in the exhaust gas in a case where an air-fuel ratio of the exhaust gas that flows into the exhaust catalyst 26 is in a narrow range in a vicinity of stoichiometry. One end of the EGR passage 28 is connected to the exhaust passage 14 downstream of the exhaust catalyst 26. An EGR cooler 30 is provided midway through the EGR passage 28. An EGR valve 32 that controls a flow rate of a gas (an EGR gas) that flows into the intake passage 12 from the EGR passage 28 is provided in the EGR passage 28 downstream of the EGR cooler 30. The other end of the EGR passage 28 is connected to the intake passage 12 upstream of the compressor 18a.

Further, the exhaust gas recirculation device of the present embodiment includes an ECU (Electronic Control Unit) 50 as a control device. As shown in FIG. 1, in addition to the aforementioned air flow meter 16 and accelerator opening degree sensor 24, a crank angle sensor 34 that detects an engine speed NE and various sensors necessary to control the engine 10 (a throttle opening degree sensor that detects an opening degree of the throttle valve 22 and the like) are electrically connected to an input side of the ECU 50.

An ignition key 36 is also electrically connected to the input side of the ECU 50. The ignition key 36 is configured to output a signal to start the engine 10, when a predetermined operation (for example, an operation of turning the ignition key 36 to a predetermined position or the like) is performed by a driver of a vehicle or the like. Note that in the present description, it is assumed that a period in which the signal is being outputted is a state corresponding to the ignition being ON, and a period in which the signal is not outputted is a state corresponding to the ignition being OFF.

On the other hand, a variable valve mechanism 38 is electrically connected to an output side of the ECU 50, in addition to the throttle valve 22 and the EGR valve 32 that are described above. The variable valve mechanism 38 is assumed that it is a mechanism that includes a function of being capable of continuously changing lift amounts and working angles of exhaust valves (not illustrated) that are provided at the respective cylinders of the engine 10 (a lift variable function) and a function of being capable of changing opening and closing timings of the exhaust valves by changing phases of exhaust cams by using a hydraulic pressure or motors (a phase variable function). The ECU 50 executes various kinds of control relating to an operation of the engine 10 by executing a predetermined program based on input information from the aforementioned various sensors, and operating the aforementioned various actuators and the like.

Feature of Embodiment 1

The EGR passage 28, the EGR cooler 30 and the EGR valve 32 that are shown in FIG. 1 configure a so-called low pressure loop (Low Pressure Loop: LPL) EGR system. According to the LPL-EGR system, a low-pressure EGR gas can be introduced into the intake passage 12 upstream of the compressor 18a. That is to say, since the low-pressure EGR gas can be introduced into intake air before being supercharged, introduction of a large amount of EGR gas is enabled. Further, according to the LPL-EGR system, the EGR gas can be cooled by the EGR cooler 30. Accordingly, a large amount of EGR gas is cooled, and thereafter can be recirculated to the engine 10. Therefore, enhancement of an effect by the EGR system such as reduction in an NOx emission amount accompanying reduction in a combustion temperature is enabled.

Incidentally, when the EGR gas is cooled in the EGR cooler 30, condensate water is sometimes generated on an inner wall thereof. Here, the condensate water which is generated during an operation of the engine 10 ordinarily flows with intake air and is taken into the engine 10. Meanwhile, during stoppage of the engine 10, the condensate water which is generated by the EGR gas in the EGR passage 28 including the EGR cooler 30 being cooled remains in the EGR cooler 30. If the remaining state continues for a long time period, the condensate water corrodes an inside of the EGR cooler 30. The reason of this is that the EGR gas contains sulfur components derived from fuel and nitrogen components derived from the exhaust gas, and as a result of these components dissolving into the condensate water, an acidic aqueous solution is generated.

Generation of the condensate water during stoppage of the engine 10 easily occurs when the engine 10 is stopped without putting a time interval after introduction of the EGR gas. This is because after introduction of the EGR gas, the EGR valve 32 is closed, and therefore when the engine 10 is stopped in this state, the EGR gas which is not introduced into the intake passage 12 remains in the EGR cooler 30. If the EGR gas is cooled with a lapse of time, condensate water is generated. Therefore, in the present embodiment, control of pushing out the EGR gas in the EGR cooler 30 to the intake passage 12 side (scavenging control) is executed by utilizing an exhaust gas pressure immediately before stoppage of the engine 10. The scavenging control will be described hereinafter with reference to FIG. 2 and FIG. 3.

Figure 2:
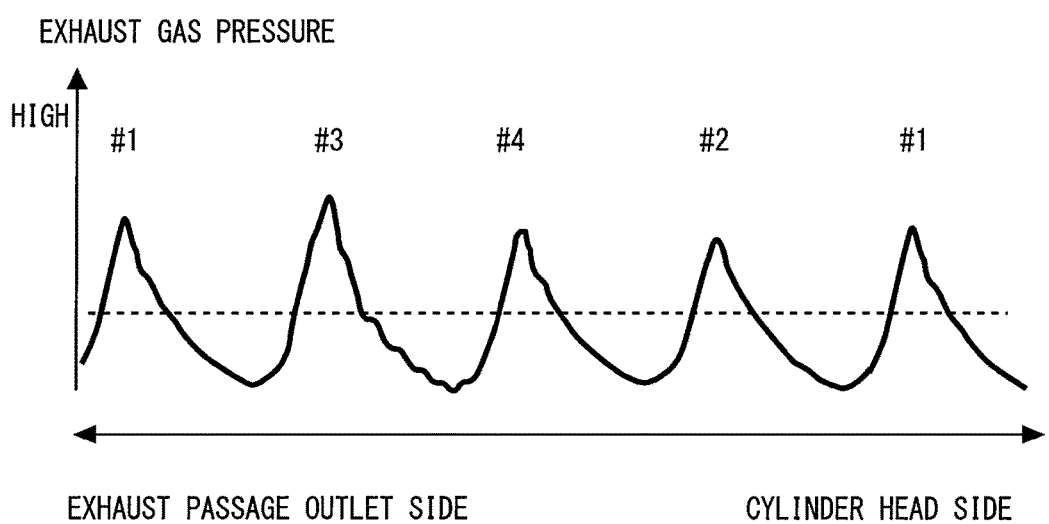
FIG. 2 is a diagram showing the exhaust gas pressure in the exhaust passage 14.

FIG. 2 is a diagram showing the exhaust gas pressure in the exhaust passage 14. Note that in the horizontal axis in FIG. 2, it is assumed that the horizontal axis is closer to a cylinder head (not illustrated) as it extends toward the right side, and the horizontal axis is away from the cylinder head (is closer to an outlet of the exhaust passage) as it extends to the left side. Since during an operation of the engine 10, pistons of the engine 10 reciprocally move and the exhaust valves also operate, interference waves by a progressive wave and a reflected wave are generated in the exhaust passage 14. Therefore, in the exhaust passage 14, spots where amplitudes of pressure are large (loops of the pressure in the case of a standing wave), and spots where amplitudes of the pressure are small (nodes of the pressure in the case of a standing wave) are observed, as shown in FIG. 2.

Here, "immediately before stoppage of the engine 10" refers to a time period until the engine speed NE becomes zero after the vehicle or the like stops and the ignition is switched from an ON state to an OFF state by the driver. In the time period, the pistons of the engine 10 perform reciprocating motions by inertia, and the exhaust valves also continue to operate. Therefore, in the time period, an exhaust pulsation shown in FIG. 2 also occurs.

Further, when the ignition is switched from the ON state to the OFF state, fuel cut (F/C) is executed. That is to say, fuel injection from the injectors are prohibited. Therefore, the gas (the fresh air) which flows into the cylinders in the above described time period is discharged into the exhaust passage 14 as it is without burning. That is to say, in the above described time period, the pulsation shown in FIG. 2 is formed by the fresh air.

In the scavenging control of the present embodiment, the pulsation of the fresh air is utilized. That is to say, an valve opening timing EVO of the exhaust valve is changed by using the phase variable function of the variable valve mechanism 38 so that a high peak portion of a pulsation of the gas that flows into the cylinders in the above described time period and is discharged occurs at an EGR branch point (namely, a connection point of the exhaust passage 14 and the EGR passage 28), and the EGR valve 32 is opened. In this manner, the fresh air flowing in the exhaust passage 14 can be introduced into the EGR passage 28, and therefore the EGR gas in the EGR cooler 30 can be replaced with the fresh air. Accordingly, condensate water can be prevented from being generated in the EGR cooler 30 during stoppage of the engine 10.

Figure 3:
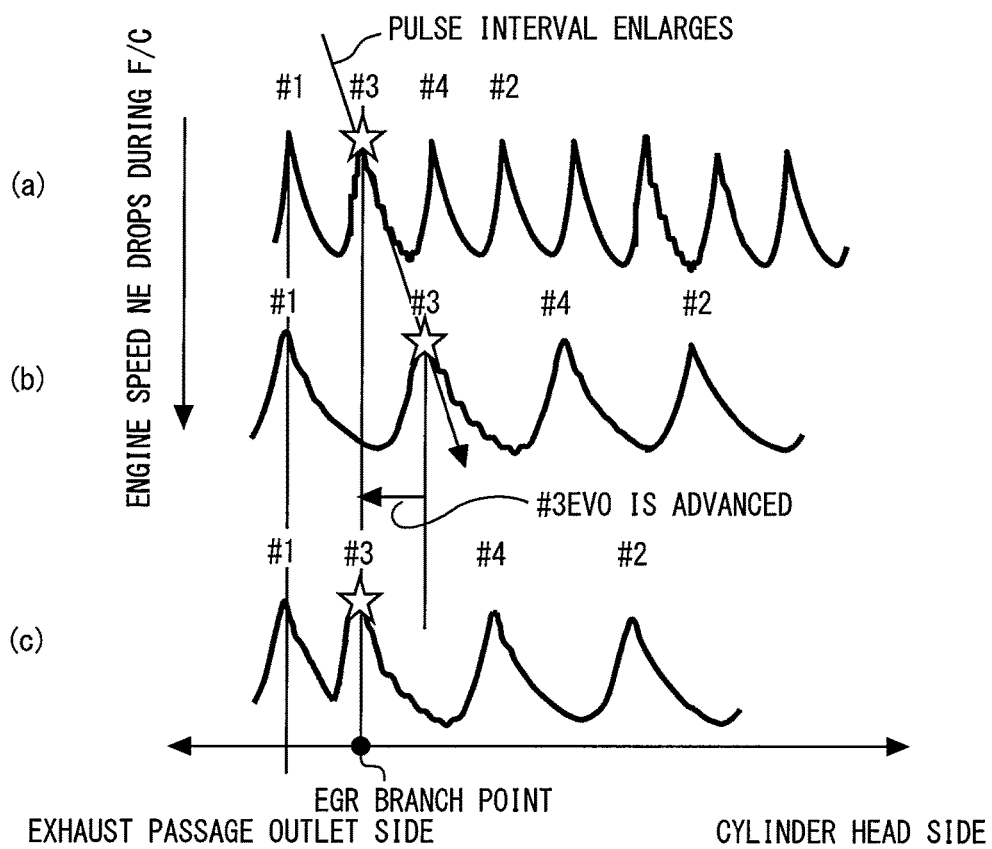
FIG. 3 is a diagram showing an advance example of the valve opening timing EVO of the exhaust valve.

However, during the above described time period, the engine speed NE continues to be reduced. Therefore, in the scavenging control of the present embodiment, the valve opening timing EVO is advanced in accordance with reduction of the engine speed NE. FIG. 3 is a diagram showing an advance example of the valve opening timing EVO of the exhaust valve. When the engine speed NE is reduced, a pulse interval of the pulsation is extended. As a result, as shown by arrows in FIGS. 3 (a) and (b), a high peak portion of a pulsation of the gas that is discharged from cylinder number 3 moves to the cylinder head side from the EGR branch point. That is to say, a long time period is required until the high peak portion of the pulsation from cylinder number 3 reaches the EGR branch point after a high peak portion of a pulsation from cylinder number 1 passes the EGR branch point. Therefore, as shown in FIG. 3 (c), the valve opening timing EVO is advanced (the exhaust valve of cylinder number 3 is opened early). By performing regulation like this, the time period until the high peak portion of the pulsation from the cylinder number 3 reaches the EGR branch point can be shortened as compared with the case of FIG. 3 (b). That is to say, the EGR gas in the EGR cooler 30 can be replaced in a short time period.

Figure 4:
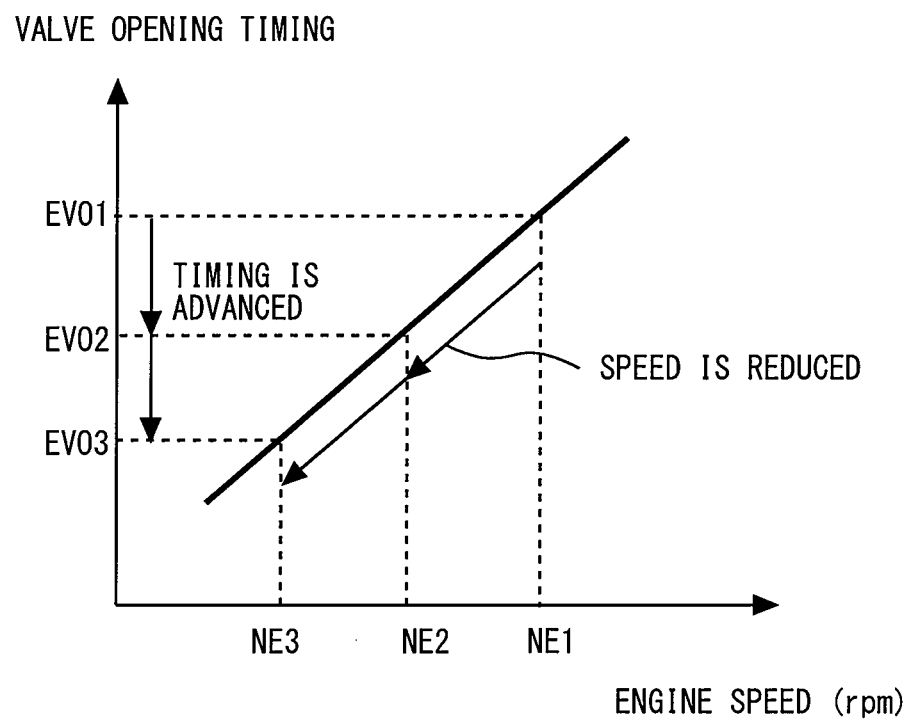
FIG. 4 is a diagram showing the relation between the engine speed NE and the valve opening timing EVO.

In order to enable peak regulation as above, in the present embodiment, a relation between the engine speed NE and the valve opening timing EVO is assumed that it is mapped and stored in the ECU 50 in advance. FIG. 4 is a diagram showing the relation between the engine speed NE and the valve opening timing EVO. As shown in FIG. 4, when the engine speed NE is reduced from $NE_1$ to $NE_2$ and $NE_3$, the valve opening timing EVO is advanced and is changed from $EVO_1$ to $EVO_2$ and $EVO_3$. Note that the relation in FIG. 4 can be determined by performing simulation or the like on the relation between the engine speed NE and the valve opening timing EVO, under a condition that a distance from the cylinder head of the engine 10 to the EGR branch point is already known.

Further, as shown in FIG. 3, low peak portions of the pulsations from the respective cylinders also pass the EGR branch point. When the low peak portions pass, the pressure in the exhaust passage 14 drops lower than a pressure (that is, an atmospheric pressure) in the intake passage 12, and there is a possibility of the fresh air that should have been introduced into the EGR passage 28 from the exhaust passage 14 flowing backward. Therefore, in the scavenging control of the present embodiment, the EGR valve 32 is opened only when the pressure at the EGR branch point becomes higher than the pressure in the intake passage 12. That is to say, the EGR valve 32 is closed when the pressure at the EGR branch point drops lower than the pressure in the intake passage 12.

In order to enable opening and closing control of the EGR valve as above, in the present embodiment, it is assumed that a pressure map defining a range of a crank angle where the pressure at the EGR branch point becomes higher than the pressure in the intake passage 12 is stored in the ECU 50. Note that the pressure map can be determined by performing simulation or the like on a relation of the engine speed NE, the valve opening timing EVO and the pressure at the EGR branch point, and the crank angle in advance, under the condition that the distance from the cylinder head of the engine 10 to the EGR branch point is already known.

Specific Processes in Embodiment 1

Figure 5:
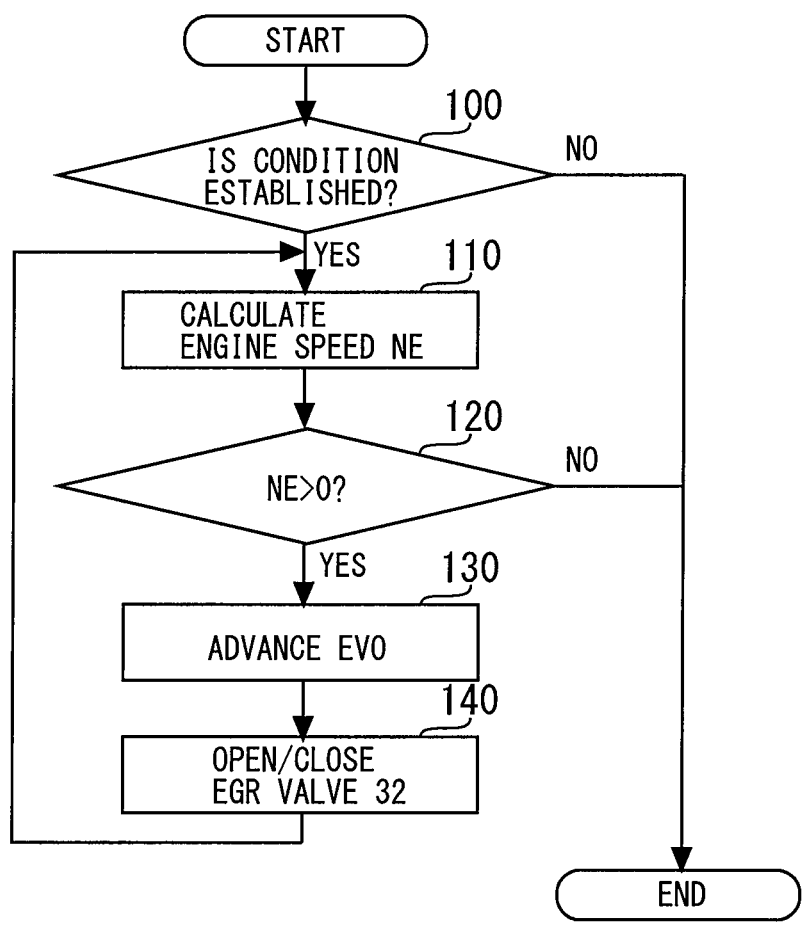
FIG. 5 is a flowchart showing a routine of the scavenging control which is executed by the ECU 50 in embodiment 1.

Next, with reference to FIG. 5, specific processes for realizing the aforementioned functions will be described. FIG. 5 is a flowchart showing a routine of the scavenging control which is executed by the ECU 50 in embodiment 1. Note that the routine shown in FIG. 5 is repeatedly executed during an operation of the engine 10.

In the routine shown in FIG. 5, the ECU 50 firstly determines whether or not a scavenging condition of the EGR gas is established (step 100). The scavenging condition is established when the ignition is switched from the ON state to the OFF state. When the ECU 50 determines that the scavenging condition is established, the ECU 50 proceeds to step 110, and when the ECU 50 determines that the scavenging condition is not established, the ECU 50 temporarily ends the present routine.

In step 110, the ECU 50 calculates the engine speed NE. Specifically, the ECU 50 calculates the engine speed NE from an output of the crank angle sensor 34. Subsequently, the ECU 50 determines whether or not NE>0 is established, with respect to the engine speed NE which is calculated in step 110 (step 120). When NE>0 is established, the ECU 50 proceeds to step 130. When NE=0 is established, it can be determined that the engine 10 stops, and therefore the ECU 50 ends the present routine.

In step 130, the ECU 50 advances the valve opening timing EVO. Specifically, the ECU 50 determines the valve opening timing EVO by applying the engine speed NE which is calculated in step 110 to the map showing the relation in FIG. 4, and inputs the determined valve opening timing EVO to the variable valve mechanism 38. Subsequently, in step 140, the ECU 50 opens or closes the EGR valve 32 in accordance with the above described pressure map, and returns to step 110 again. That is to say, the processes in steps 110, 130 and 140 are executed by repeatedly until the engine speed NE=0 is established.

As above, according to the routine shown in FIG. 5, in a case where the scavenging condition of the EGR gas is established, the valve opening timing EVO can be advanced based on the relation in FIG. 4, until the engine speed NE=0 is established. Accordingly, immediately before stoppage of the engine 10, the EGR gas in the EGR cooler 30 can be replaced with the fresh air that flows in the exhaust passage 14.

Incidentally, in embodiment 1 described above, explanation has been made with the LPL-EGR system taken as an example. However, the scavenging control of embodiment 1 described above can be also applied to a high pressure loop (High Pressure Loop: HPL) EGR system that is configured by an EGR passage that connects the intake passage 12 downstream of the intercooler 20 and the exhaust passage 14 upstream of the turbine 18b, and an EGR cooler and an EGR valve (both are not illustrated) that are provided in the EGR passage. Describing more, the scavenging control can be also applied to a non-supercharging EGR system that does not include the turbocharger 18 and the intercooler 20.

Further, in embodiment 1 described above, the scavenging control is executed immediately before stoppage of the engine 10, but the execution timing of the exhaust control is not limited to this. For example, when a so-called idling stop that stops the engine 10 during parking and waiting at traffic lights is performed, fuel cut is executed. Therefore, if the scavenging control similarly to embodiment 1 described above is executed during the idling stop, the EGR gas in the EGR cooler 30 can be replaced with the fresh air which flows in the exhaust passage 14. That is to say, similar scavenging control can be performed before the scavenging control of embodiment 1 described above is executed. Therefore, generation of condensate water in the period of stoppage of the engine 10 can be favorably prevented by executing exhaust control that is performed during the idling stop solely, or in combination with the scavenging control of embodiment 1 described above.

Figure 6:
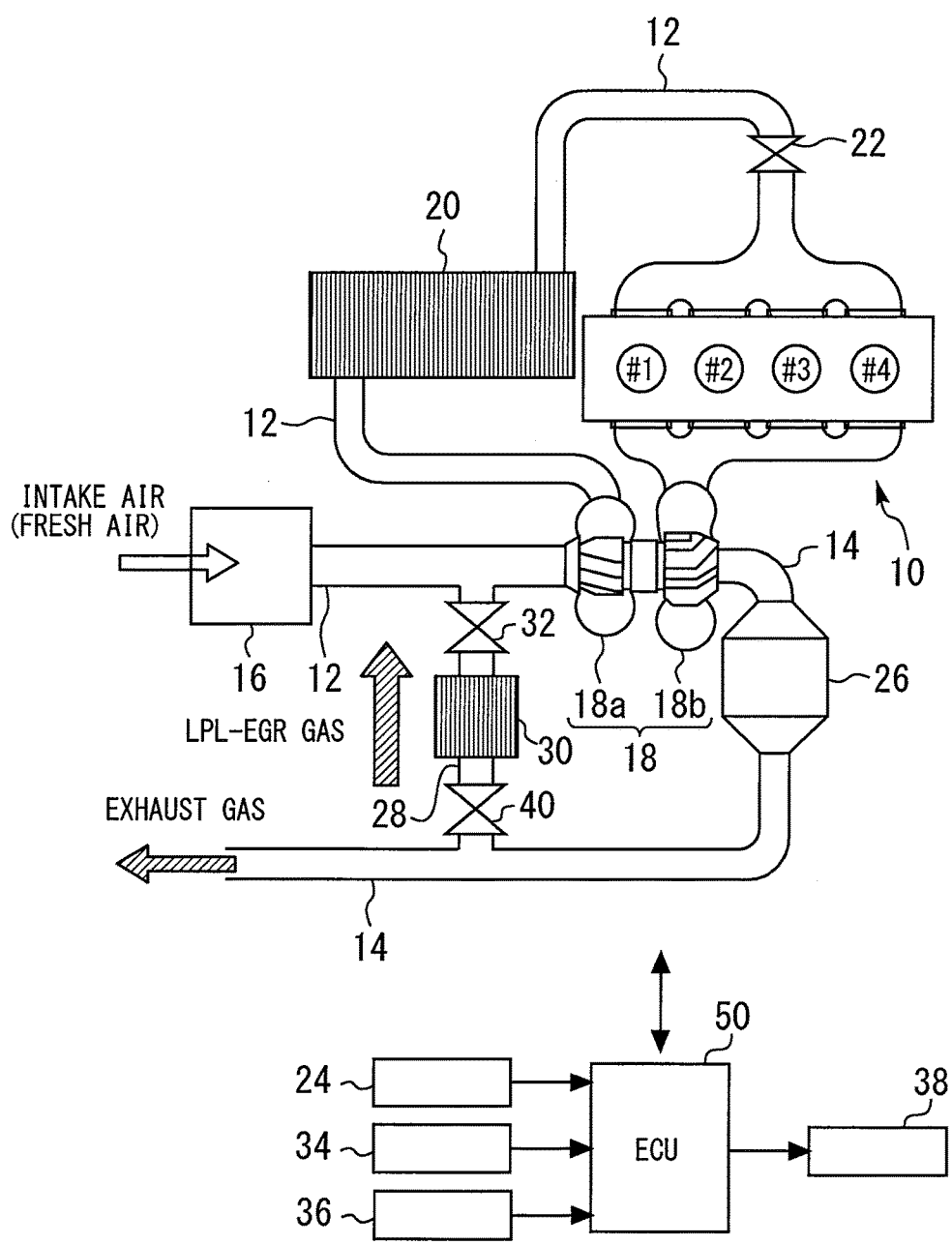
FIG. 6 is a diagram showing a modification example of embodiment 1.

Further, in embodiment 1 described above, backflow of the fresh air to the EGR passage 28 from the exhaust passage 14 is prevented by opening and closing control of the EGR valve 32, but the backflow can be also prevented by providing a check valve on the EGR passage 28, for example. FIG. 6 is a diagram showing a modification example of embodiment 1. As shown in FIG. 6, a check valve 40 that is normally closed is provided in the EGR passage 28 upstream of the EGR cooler 30. The check valve 40 is configured to open when the pressure in the exhaust passage 14 surpasses the pressure (that is, the atmospheric pressure) in the intake passage 12. That is to say, when the pressure in the exhaust passage 14 is higher than the atmospheric pressure, the exhaust passage 14 and the EGR passage 28 communicate with each other, and the gas flowing in the exhaust passage 14 is enabled to flow into the EGR passage 28.

Further, in embodiment 1 described above, peak regulation of the pulsation is performed by using the relation between the engine speed NE and the valve opening timing EVO (namely, the relation in FIG. 4). However, peak regulation of the pulsation may be performed without using the relation. Specifically, peak regulation of the pulsation may be performed by using a change of the intake flow rate that is detected by the air flow meter 16. When the gas flows into the intake passage 12 from the EGR passage 28, a pulsation of the gas interferes with intake air that flows in the intake passage 12, and therefore the intake air flow rate changes. Accordingly, if the valve opening timing EVO is advanced by using the change, the time period until the high peak portion of the pulsation reaches the EGR branch point can be shortened as shown in FIG. 3 (c). Note that the peak regulation using the air flow meter 16 and the variable valve mechanism 38 may be performed with an objective of further correcting the peak regulation using the relation in FIG. 4.

Note that in embodiment 1 described above, "variable valve mechanism control means" in the above described first invention is realized by the ECU 50 executing the process in step 130 in FIG. 5, and "EGR passage opening and closing means" in the first invention is realized by the ECU 50 executing the process in step 140 in FIG. 5, respectively.

Further, in the modification example of embodiment 1 described above, the check valve 40 corresponds to "the EGR passage opening and closing means" in the above described first invention.

Further, in the modification example of embodiment 1 described above, "valve opening timing regulating means" in the above described fourth invention is realized by the ECU 50 advancing the valve opening timing EVO by using the change of the above described intake flow rate.

Embodiment 2

Feature of Embodiment 2

Next, embodiment 2 of the present invention will be described with reference to FIG. 7.

At the time of execution of the scavenging control of embodiment 1 described above, the valve opening timing EVO of the exhaust valve is advanced by using the phase variable function of the variable valve mechanism 38. However, if the valve opening timing EVO is simply advanced, a valve overlap amount generated by both the intake valves and the exhaust valves being opened varies, and therefore, a trouble arises. For example, when the valve overlap amount decreases, pump loss becomes large, and drivability is deteriorated. Therefore, in the present embodiment, control (working angle changing control) is to be executed, which changes a working angle EOA of the exhaust valve by using the lift variable function of the variable valve mechanism 38.

Figure 7:
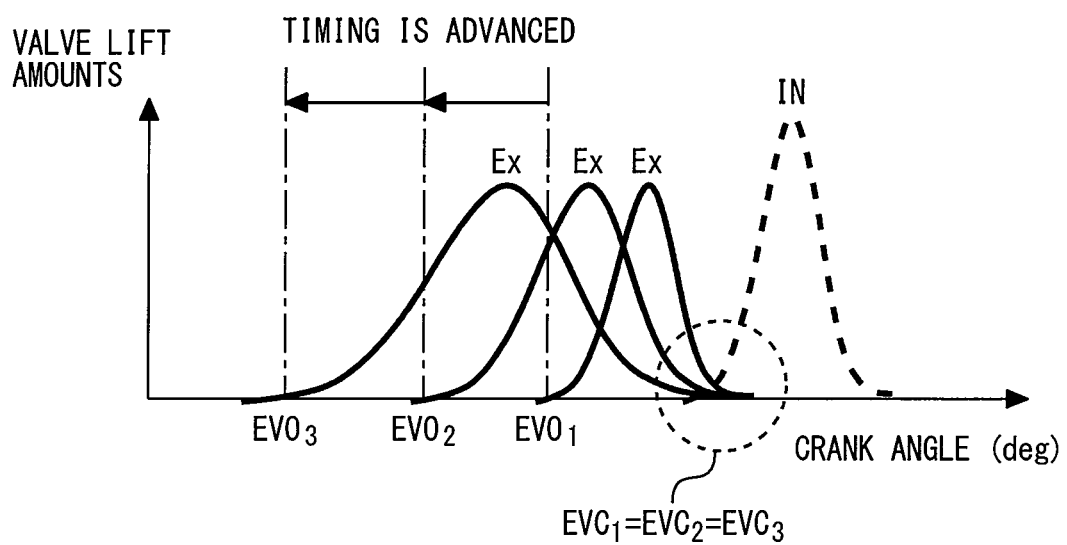
FIG. 7 is a diagram for explaining the working angle changing control in embodiment 2.

FIG. 7 is a diagram for explaining the working angle changing control in embodiment 2. As shown in FIG. 7, during execution of the scavenging control of the present embodiment, the valve opening timing EVO is advanced from $EVO_1$ to $EVO_2$ and $EVO_3$ in accordance with reduction in the engine speed NE. At the same time, the working angle EOA is enlarged from $EOA_1$ to $EOA_2$ and $EOA_3$. Thus, a valve closing timing EVC of the exhaust valve does not change ($EVC_1 = EVC_2 = EVC_3$), and therefore, the valve overlap amount is enabled to be kept constant. Accordingly, the effect by the scavenging control of embodiment 1 described above can be obtained while a sense of deceleration that the driver of the vehicle or the like feels is kept constant.

In order to enable working angle regulation as above, in the present embodiment, it is assumed that the relation between the engine speed NE and the working angle EOA is obtained in advance by simulation or the like, and is mapped and stored in the ECU 50.

Incidentally, in embodiment 2 described above, the working angle EOA is enlarged in accordance with reduction of the engine speed NE. However, as described in the modification example of embodiment 1 described above, there is the case where the engine speed NE increases. In the case like this, the valve opening timing EVO is delayed in accordance with increase of the engine speed NE, based on the relation shown in FIG. 4, and therefore, if the working angle EOA is reduced at the same time, an effect as in the present embodiment can be obtained.

DESCRIPTION OF REFERENCE NUMERALS

10 Engine
12 Intake passage
14 Exhaust passage
16 Air flow meter
28 EGR passage
30 EGR cooler
32 EGR valve
34 Crank angle sensor
36 Ignition key
38 Variable valve mechanism
40 Check valve
50 ECU

The invention claimed is:

1. An exhaust gas recirculation device, comprising:
an EGR passage that connects an intake passage and an exhaust passage of an internal combustion engine;
EGR passage opening and closing means for opening and closing the EGR passage;
an exhaust valve that is provided at a cylinder of the internal combustion engine;
a variable valve mechanism that is capable of changing a valve opening characteristic of the exhaust valve; and
variable valve mechanism control means for controlling the variable valve mechanism,
wherein the variable valve mechanism control means changes a valve opening timing of the exhaust valve during non-execution of fuel injection, and causes a position where an amplitude of a pressure in the exhaust passage becomes maximum to coincide with a connection portion of the EGR passage and the exhaust passage, and the EGR passage opening and closing means opens the EGR passage when a pressure in the connection portion is higher than a pressure in the intake passage, and closes the EGR passage when the pressure in the connection portion is equal to or lower than the pressure in the intake passage, during non-execution of fuel injection.

2. The exhaust gas recirculation device according to claim 1,
wherein the variable valve mechanism is configured to be capable of changing the valve opening timing in accordance with an engine speed of the internal combustion engine, and
the variable valve mechanism control means advances the valve opening timing as the engine speed drops.

3. The exhaust gas recirculation device according to claim 2,
wherein the variable valve mechanism is configured to be capable of changing a working angle of the exhaust valve in accordance with the engine speed, and
the variable valve mechanism control means enlarges the working angle as the engine speed drops.

4. The exhaust gas recirculation device according to claim 1, further comprising:
an air flow meter that detects a change of a flow velocity of intake air that flows in the intake passage; and
valve opening timing regulating means for regulating the valve opening timing in accordance with the change of the flow velocity of the intake air which is detected by the air flow meter during non-execution of fuel injection.

5. An exhaust gas recirculation device, comprising:
an EGR passage that connects an intake passage and an exhaust passage of an internal combustion engine;
an EGR passage opening and closing unit that opens and closes the EGR passage;
an exhaust valve that is provided at a cylinder of the internal combustion engine;
a variable valve mechanism that is capable of changing a valve opening characteristic of the exhaust valve; and
a variable valve mechanism control unit that controls the variable valve mechanism,
wherein the variable valve mechanism control unit changes a valve opening timing of the exhaust valve during non-execution of fuel injection, and causes a position where an amplitude of a pressure in the exhaust passage becomes maximum to coincide with a connection portion of the EGR passage and the exhaust passage, and
the EGR passage opening and closing unit opens the EGR passage when a pressure in the connection portion is higher than a pressure in the intake passage, and closes the EGR passage when the pressure in the connection portion is equal to or lower than the pressure in the intake passage, during non-execution of fuel injection.

6. The exhaust gas recirculation device according to claim 5,
wherein the variable valve mechanism is configured to be capable of changing the valve opening timing in accordance with an engine speed of the internal combustion engine, and
the variable valve mechanism control unit advances the valve opening timing as the engine speed drops.

7. The exhaust gas recirculation device according to claim 5,
wherein the variable valve mechanism is configured to be capable of changing a working angle of the exhaust valve in accordance with the engine speed, and
the variable valve mechanism control unit enlarges the working angle as the engine speed drops.

8. The exhaust gas recirculation device according to claim 5, further comprising:
an air flow meter that detects a change of a flow velocity of intake air that flows in the intake passage; and
valve opening timing regulating unit that regulates the valve opening timing in accordance with the change of the flow velocity of the intake air which is detected by the air flow meter during non-execution of fuel injection.

* * * * *